(12) United States Patent
Clauser et al.

(10) Patent No.: US 9,120,411 B2
(45) Date of Patent: Sep. 1, 2015

(54) AUTOMOTIVE SEAT FOAM PAD ASSEMBLY

(75) Inventors: James Bradley Clauser, Oakland Township, MI (US); Paul S. Severinski, Brownstown, MI (US); William Joseph Paruszkiewicz, Clinton Township, MI (US); Louella Ann Patterson, Wales, MI (US)

(73) Assignee: Lear Corporation, Southfield, MI (US)

( * ) Notice: Subject to any disclaimer, the term of this patent is extended or adjusted under 35 U.S.C. 154(b) by 1191 days.

(21) Appl. No.: 12/493,637

(22) Filed: Jun. 29, 2009

(65) Prior Publication Data

US 2010/0007122 A1 Jan. 14, 2010

Related U.S. Application Data

(60) Provisional application No. 61/080,617, filed on Jul. 14, 2008.

(51) Int. Cl.
*B60R 21/207* (2006.01)
*B60N 2/68* (2006.01)

(52) U.S. Cl.
CPC ............ *B60N 2/68* (2013.01); *B60R 21/207* (2013.01)

(58) Field of Classification Search
USPC .......... 280/730.2; 297/452.31, 452.32, 452.2, 297/216.13
See application file for complete search history.

(56) References Cited

U.S. PATENT DOCUMENTS

| | | | |
|---|---|---|---|
| 5,860,673 A | 1/1999 | Hasegawa | |
| 5,899,489 A * | 5/1999 | Jost | ............................ 280/730.2 |
| 5,988,674 A | 11/1999 | Kimura | |
| 5,997,032 A | 12/1999 | Miwa | |
| 6,050,636 A | 4/2000 | Chevallier | |
| 6,126,192 A | 10/2000 | Enders | |
| 6,206,410 B1 | 3/2001 | Brown | |
| 6,206,466 B1 | 3/2001 | Komatsu | |
| 6,213,498 B1 | 4/2001 | Ghalambor | |
| 6,213,550 B1 | 4/2001 | Yoshida | |
| 6,217,062 B1 | 4/2001 | Breyvogel | |
| 6,352,304 B1 | 3/2002 | Sorgenfrei | |
| 6,364,347 B1 * | 4/2002 | Holdampf et al. | ......... 280/730.2 |
| 6,364,348 B1 | 4/2002 | Jang | |
| 6,382,665 B2 * | 5/2002 | Holdampf et al. | ......... 280/730.2 |
| 6,451,233 B1 | 9/2002 | Byma | |
| 6,513,747 B1 | 2/2003 | Lee | |
| 6,588,838 B1 | 7/2003 | Dick, Jr. | |
| 6,725,509 B1 | 4/2004 | Lee | |
| 6,805,542 B2 | 10/2004 | Byma | |
| 7,134,685 B2 | 11/2006 | Panagos | |
| 7,134,686 B2 | 11/2006 | Tracht | |
| 7,195,274 B2 | 3/2007 | Tracht | |
| 7,195,277 B2 | 3/2007 | Tracht | |
| 7,281,733 B2 | 10/2007 | Pieruch | |
| 7,284,768 B2 | 10/2007 | Tracht | |
| 7,290,791 B2 | 11/2007 | Tracht | |
| 7,290,792 B2 | 11/2007 | Tracht | |
| 7,290,793 B2 | 11/2007 | Tracht | |
| 7,290,794 B2 | 11/2007 | Tracht | |
| 7,311,325 B2 | 12/2007 | Tracht | |

(Continued)

*Primary Examiner* — Faye M Fleming
(74) *Attorney, Agent, or Firm* — Brooks Kushman P.C.

(57) ABSTRACT

An automotive seat back foam pad assembly includes a seat back foam pad and a panel. The seat back foam pad is configured to receive a seat back frame and includes a side pocket. The side pocket has a sidewall portion and is configured to receive an air bag module. The panel is attached to the sidewall portion and attachable with the seat back frame. The panel is configured to maintain integrity of the sidewall portion during air bag module deployment.

12 Claims, 4 Drawing Sheets

(56) References Cited

U.S. PATENT DOCUMENTS

| | | |
|---|---|---|
| 7,322,597 B2 | 1/2008 | Tracht |
| 7,325,825 B2 | 2/2008 | Tracht |
| 7,328,912 B2 | 2/2008 | Tracht |
| 7,331,601 B2 | 2/2008 | Tracht |
| 7,334,811 B2 | 2/2008 | Tracht |
| 7,357,412 B2 | 4/2008 | Tracht |
| 7,377,542 B2 | 5/2008 | Tracht |
| 7,380,812 B2 | 6/2008 | Tracht |
| 7,390,015 B2 | 6/2008 | Tracht |
| 7,441,797 B2 | 10/2008 | Tracht |
| 7,445,234 B2 | 11/2008 | Hofmann |
| 7,458,603 B2 | 12/2008 | Buono |
| 7,669,889 B1* | 3/2010 | Gorman et al. ............ 280/730.2 |
| 7,677,596 B2* | 3/2010 | Castro et al. .............. 280/730.2 |
| 2001/0019202 A1* | 9/2001 | Holdampf et al. ......... 280/730.2 |
| 2006/0113764 A1 | 6/2006 | Tracht |
| 2007/0040362 A1* | 2/2007 | Saberan .................... 280/730.2 |
| 2007/0222190 A1* | 9/2007 | Tracht ...................... 280/730.2 |
| 2008/0054604 A1* | 3/2008 | Castro et al. .............. 280/730.2 |
| 2009/0020988 A1* | 1/2009 | Sato et al. ................. 280/730.2 |
| 2010/0194083 A1* | 8/2010 | Sugimoto et al. ......... 280/730.2 |

\* cited by examiner

AUTOMOTIVE SEAT FOAM PAD ASSEMBLY

CROSS-REFERENCE TO RELATED APPLICATION

This application claims the benefit of U.S. Provisional Application No. 61/080,617, filed Jul. 14, 2008, which is hereby incorporated by reference in its entirety.

BACKGROUND

U.S. Pat. No. 7,458,603 to Buono et al. discloses an air bag guide for a vehicle seat component that includes flexible inner and outer panels having outer extremities located adjacent a release seam of a trim cover. The outer extremity of the flexible inner panel is secured to the trim cover. The outer extremity of the flexible outer panel is unconnected to the trim cover and curved to provide a guide flap.

U.S. Pat. No. 7,311,325 to Tracht et al. discloses a vehicle seat assembly that comprises a frame, a seat pad, a trim cover including a release seam, a connector to maintain the release seam in a closed position, and an air bag assembly within the trim cover. The air bag assembly includes an air bag inflatable to project outwardly through the air bag release seam when the air bag seam is in an opened position. The vehicle seat assembly further includes an air bag guide and a member comprising a first end portion secured to the air bag guide and a second end portion secured to the connector, with the member being movable in response to inflation of the air bag to break the connector to allow the tear seam to move to the opened position.

U.S. Pat. No. 5,860,673 to Hasegawa et al. discloses a seat structure having a side impact air bag apparatus integrated into a side portion of a seat back opposing a vehicle door. The air bag apparatus is activated at the time of a side impact such that a sewn portion of a seat surface layer breaks and an air bag body inflates between a side portion of a vehicle body and the side of a vehicle occupant. The sewn portion of the seat surface layer is formed by sewing a front seat surface layer for covering the front of the seat back to a side seat surface layer for covering the side of the seat back. A sheet member is provided inside the side seat surface layer integrally with the side seat surface layer. The sheet member is harder to stretch than the side seat surface layer. One end of the sheet member is sewn to the sewn portion. A fixing member is provided inside the seat back. The fixing member is engaged with another end of the sheet member, which is provided on the opposite side of the one end of the sheet member.

United States Patent Application Publication 2006/0113764 to Tracht discloses a vehicle seat assembly that includes a frame for mounting the seat to a vehicle. The seat assembly also includes a seat pad molded from a polymeric material and located proximate the frame. A trim cover is disposed over the seat pad, and includes a seam adjacent a side of the seat pad. An airbag assembly, which includes an airbag and an inflator configured to supply gas to the airbag, is also part of the seat assembly. A pad shield is molded in situ with the seat pad, and covers at least a portion of the seat pad for protecting it during deployment of the airbag. The pad shield includes first and second portions which form a deployment channel for the airbag, and thereby inhibit contact of the airbag with the seat pad as the airbag deploys.

SUMMARY

An automotive seat back includes a seat back foam pad, a seat back frame set within the seat back foam pad, and an air bag module. The seat back foam pad includes a side pocket having a sidewall portion. The air bag module is disposed within the side pocket and adjacent to the sidewall portion. The seat back also includes a panel attached to the sidewall portion and the seat back frame. The panel may be glued to or integrated with the sidewall portion. The panel may include a body portion and a tab portion. The body portion may be attached to the sidewall portion and the tab portion may be attached to the frame. The body portion may maintain integrity of the sidewall portion during air bag module deployment. The panel may comprise a fabric.

An automotive seat back foam pad assembly includes a seat back foam pad and a panel. The seat back foam pad is configured to receive a seat back frame and includes a side pocket. The side pocket has a sidewall portion and is configured to receive an air bag module. The panel is attached to the sidewall portion and attachable with the seat back frame. The panel is configured to maintain integrity of the sidewall portion during air bag module deployment. The panel may be glued to or integrated with the sidewall portion. The panel may include a body portion and a tab portion. The body portion may be attached to the sidewall portion and the tab portion may be attachable to the seat back frame. The body portion may be configured to maintain integrity of the sidewall portion during air bag module deployment. The panel may comprise a fabric.

An automotive seat back includes a seat back foam pad, a seat back frame, and an air bag module. The seat back foam pad includes a side pocket having a sidewall portion. The seat back frame is set within the seat back foam pad. The sidewall portion is tethered to the seat back frame. The air bag module is disposed within the side pocket and adjacent to the sidewall portion. The seat back may further include a panel. The sidewall portion may be tethered to the frame via the panel. The panel may be glued to or integrated with the sidewall portion. The panel may include a body portion and a tab portion. The body portion may be attached to the sidewall portion and the tab portion may be attached to the seat back frame. The body portion may be configured to maintain integrity of the sidewall portion during air bag module deployment. The panel may comprise a fabric.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
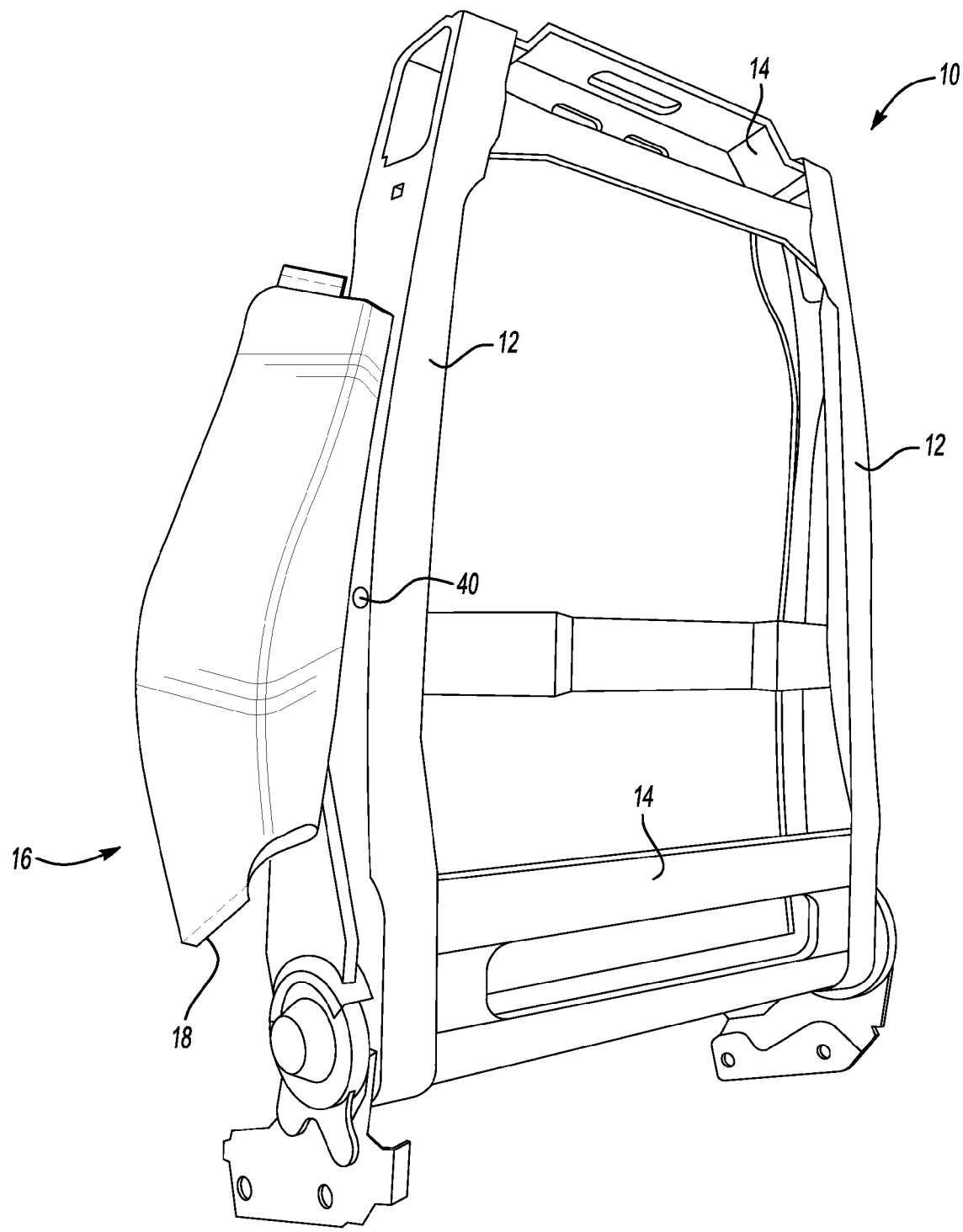
FIG. 1 is rear perspective view of an automotive seat back structure assembly.
Figure 2:
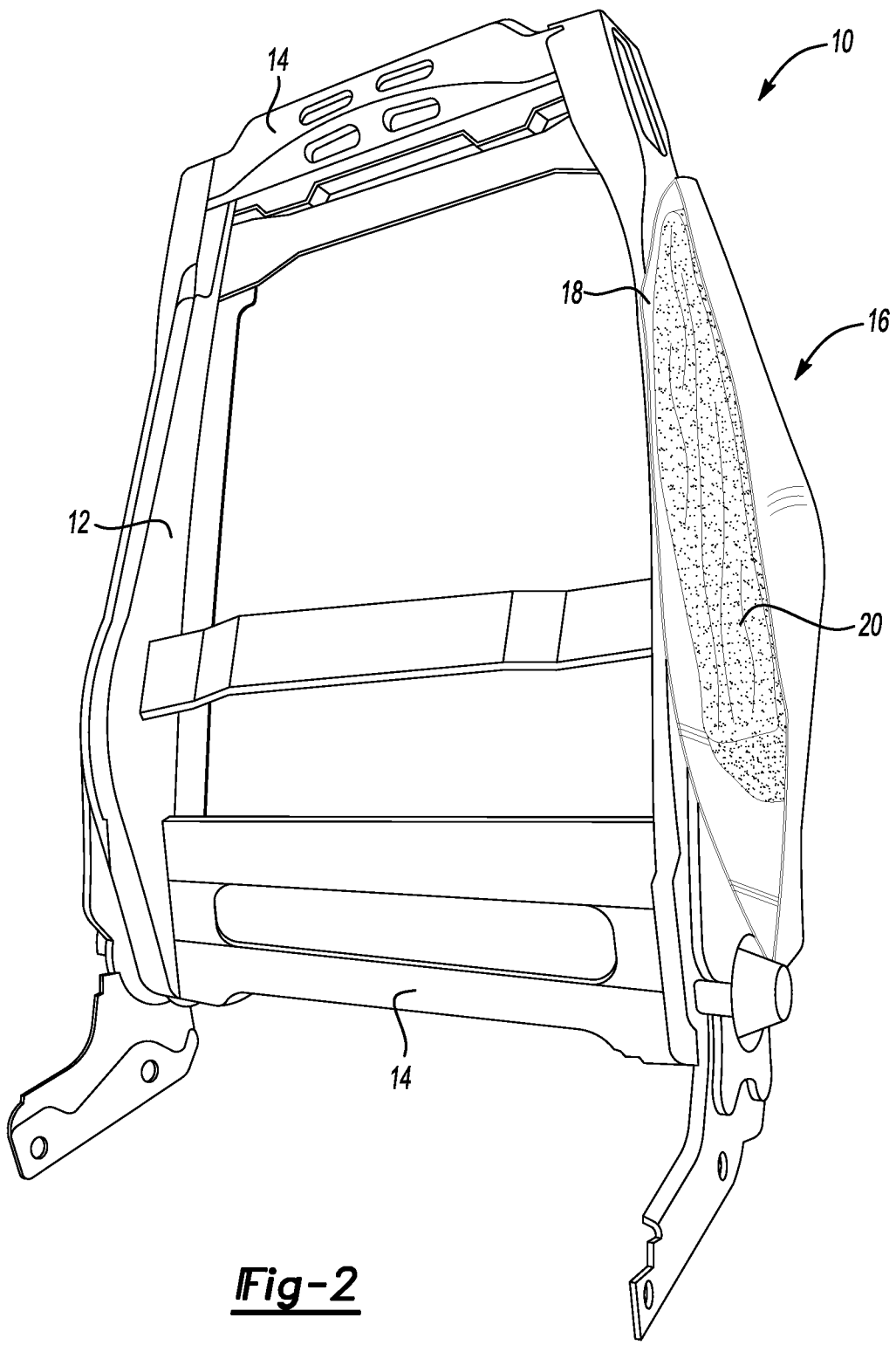
FIG. 2 is a front perspective view of the automotive seat back structure assembly of FIG. 1.

Referring now to FIGS. 1 and 2, a seat back structure 10 for an automotive vehicle seat (not shown) may include, inter alia, side members 12 and cross members 14. The side and cross members 12, 14 are, in the embodiment of FIG. 1, welded together to form the seat back structure 10. Any suitable configuration, however, may be used to form the seat back structure 10.

In embodiment of FIGS. 1 and 2, an airbag system 16 includes a directional airbag guide 18 and airbag module 20. The directional airbag guide 18 is folded around the airbag module 20, thus forming a pocket (or taco) in which the airbag module 20 resides. Fasteners (not shown), e.g., bolts, affixed to the airbag module 20 pass through openings (not shown) in the directional airbag guide 18 and are attached to one of the side members 12. In the embodiment of FIG. 1, the directional airbag guide 18 and airbag module 20 are attached to the outboard side member 12.

As apparent to those of ordinary skill, the directional airbag guide 18 directs the airbag module 20, during inflation, toward a deployment seam (not shown) of a trim cover (not shown) for the seat back structure 10.

Figure 3:
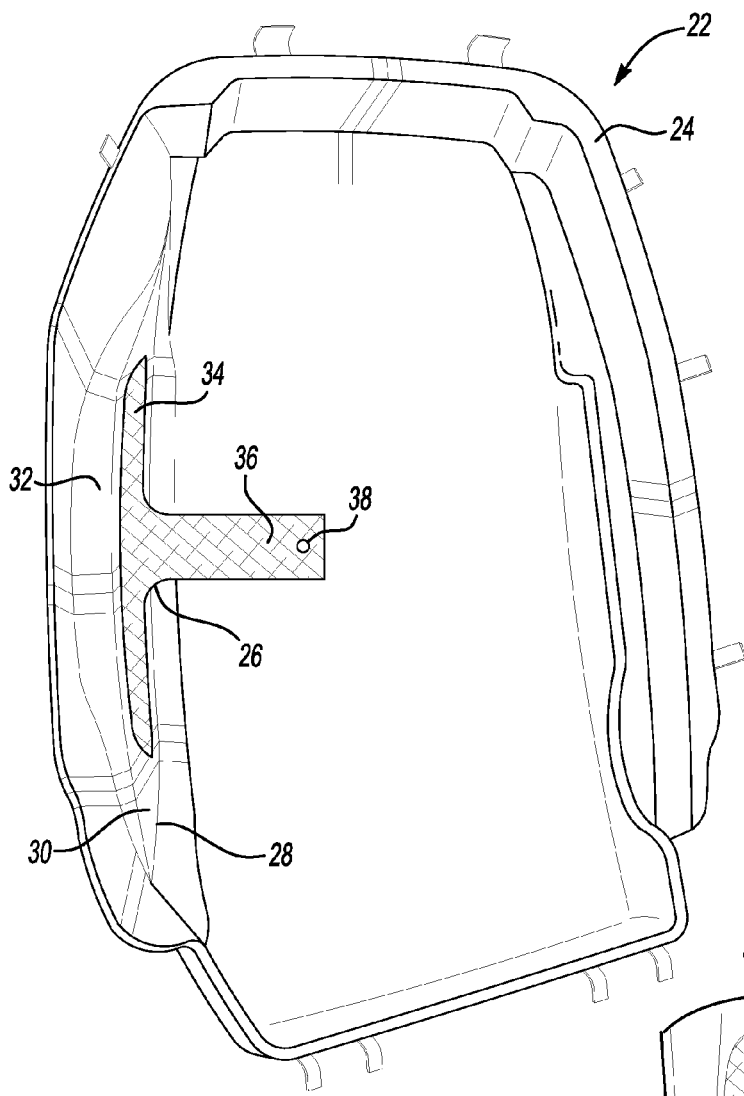
FIG. 3 is a rear perspective view of an embodiment of a foam pad assembly for the automotive seat back structure assembly of FIG. 1.
Figure 4:
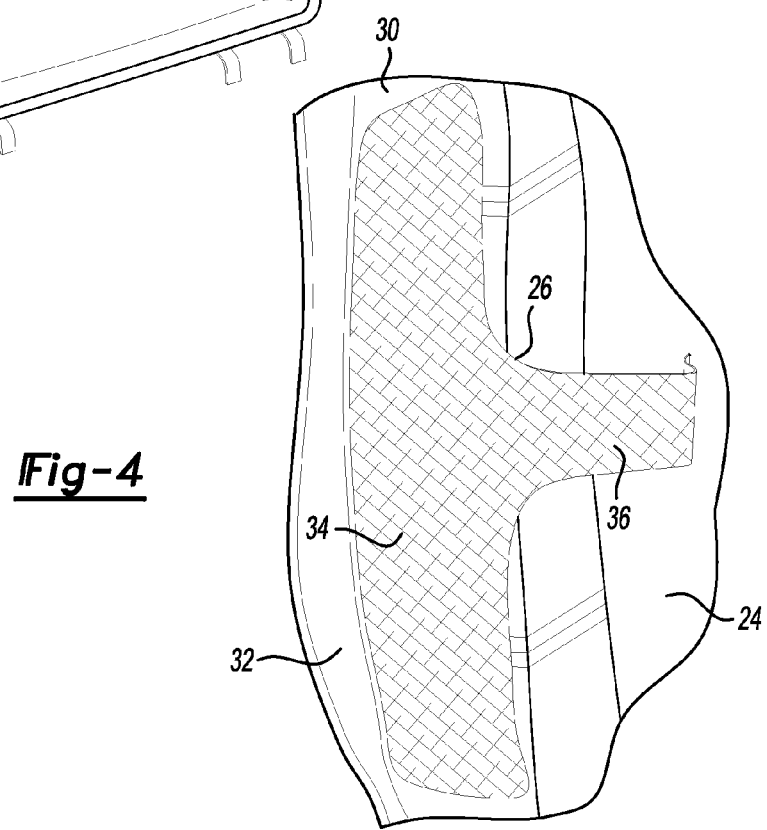
FIG. 4 is an enlarged view of a portion of the foam pad assembly of FIG. 3.

Referring now to FIGS. 3 and 4, an embodiment of a foam pad assembly 22 for the seat back structure 10 illustrated in FIGS. 1 and 2 includes a foam pad 24 and panel 26. The foam pad 24 includes an airbag pocket 28 defined by inner and outer airbag pocket walls 30, 32 respectively. The directional airbag guide 18 and airbag module 20 illustrated in FIGS. 1 and 2 (when assembled) may be disposed between the inner and outer airbag pocket walls 30, 32. In other embodiments, particularly those that lack the directional airbag guide 18, the airbag module 20 may be disposed between the inner and outer airbag pocket walls 30, 32 respectively. Other arrangements are, of course, also possible.

The panel 26 of FIGS. 3 and 4 includes a body portion 34 and a tab portion 36, and, as explained below, tethers the foam pad 24 to the seat back structure 10 illustrated in FIGS. 1 and 2. In other embodiments, the panel 26 may include several tab portions 36. Such panels 26 may, for example, loosely resemble a hand with several fingers. Other shapes and configurations are also possible. As an example, the panel 26 may resemble a strap, an "L," an "I," etc. As another example, the tab portion 36 may be split or layered such that it resembles a "Y," etc.

The body portion 34 is molded in place with the inner airbag pocket wall 30. The body portion 34 may alternatively be bonded, adhered, fixed or otherwise attached with the inner or outer airbag pocket walls 30, 32 respectively. Of course, a panel (with or without a tab portion) may be attached with each of the inner and outer airbag pocket walls 30, 32.

The body portion 34 may be sized and/or shaped to cover the deployment area associated with the inner and/or outer airbag pocket walls 30, 32 so as to maintain integrity of the foam material comprising the inner and/or outer airbag pocket walls 30, 32. The body portion 34 illustrated in FIGS. 3 and 4 is generally rectangular. In other embodiments, however, the body portion 34 may have any suitable size and/or shape. For example, the body portion 34 may be circular, elliptical, oblong, etc. The body portion 34 may also have the same width as the tab portion 36.

The panel 26 of FIGS. 3 and 4 comprises an airbag chute material, e.g., Codon. Any suitable reinforcing material, however, may be used.

As explained below, the tab portion 36 may be wrapped around one of the side members 12, the directional airbag guide 18 and/or the airbag module 20 (illustrated in FIGS. 1 and 2). The tab portion 36 may also be anchored to one of the side members 12. In the embodiment of FIGS. 3 and 4, a fastener 38, e.g., push pin, j-clip, Velcro, etc., is included with the tab portion 36. The fastener 38 may be used to anchor the panel 26 to, for example, one of the side members 12.

Figure 5:
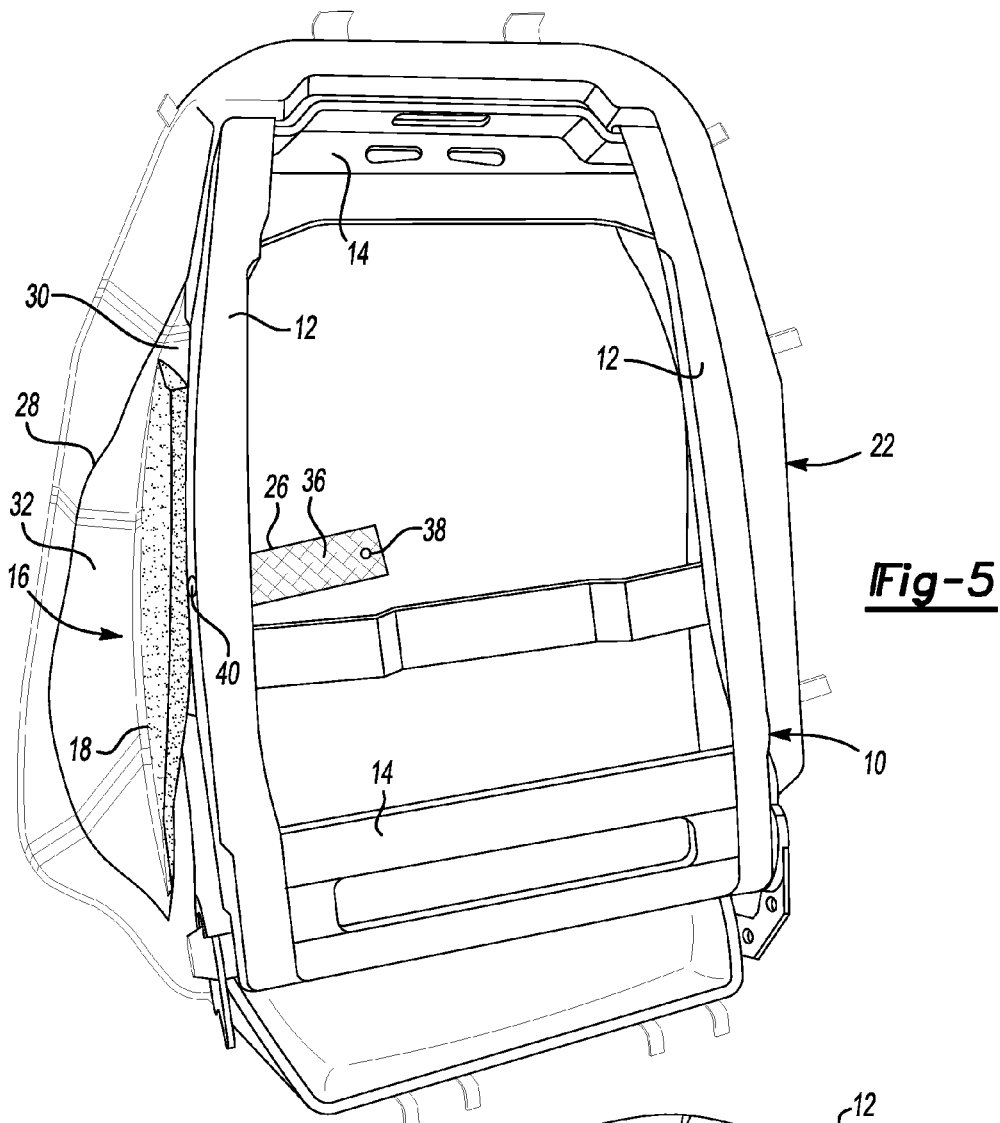
FIG. 5 is a perspective assembly view of the automotive seat back structure assembly of FIG. 1 and foam pad assembly of FIG. 3.
Figure 6:
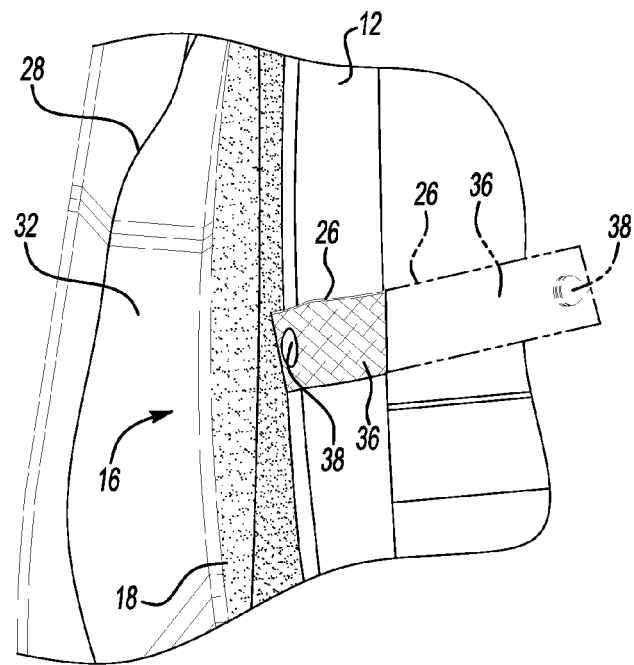
FIG. 6 is an enlarged view of a portion of the automotive seat back structure assembly and foam pad assembly of FIG. 5.

Referring now to FIGS. 5 and 6, the seat back structure 10 is positioned within the foam pad assembly 22. The tab portion 36 is wrapped around the outboard side member 12. The fastener 38 is fastened to the side member 12 (the side member 12 includes a suitable aperture 40 configured to receive the fastener 38). The reinforcement 26 may reinforce the foam pad assembly 22, guide the air module 20 toward the deployment seam (not shown) of the trim cover (not shown) and/or anchor the foam pad assembly 22 to the seat back structure 10.

While embodiments of the invention have been illustrated and described, it is not intended that these embodiments illustrate and describe all possible forms of the invention. The words used in the specification are words of description rather than limitation. It is understood that various changes may be made without departing from the spirit and scope of the invention.

What is claimed:

1. An automotive seat back comprising:
a seat back foam pad forming a side pocket having a sidewall portion;
a seat back frame set within the seat back foam pad;
an air bag module disposed within the side pocket and adjacent to the sidewall portion; and
a panel attached to the sidewall portion and the seat back frame.

2. The seat back of claim 1 wherein the panel is glued to the sidewall portion.

3. The seat back of claim 1 wherein the panel is integrated with the sidewall portion.

4. The seat back of claim 1 wherein the panel includes a body portion and a tab portion and wherein the body portion is attached to the sidewall portion and the tab portion is attached to the frame.

5. The seat back of claim 4 wherein the body portion is configured to maintain integrity of the sidewall portion during air bag module deployment.

6. The seat back of claim 1 wherein the panel comprises a fabric.

7. An automotive seat back foam pad assembly comprising:
a seat back foam pad configured to receive a seat back frame and forming a side pocket configured to receive an air bag module, wherein the side pocket has a sidewall portion; and
a panel attached to the sidewall portion and attachable with the seat back frame, wherein the panel is configured to maintain integrity of the sidewall portion during air bag module deployment.

8. The assembly of claim 7 wherein the panel is glued to the sidewall portion.

9. The assembly of claim 7 wherein the panel is integrated with the sidewall portion.

10. The assembly of claim 7 wherein the panel includes a body portion and a tab portion and wherein the body portion is attached to the sidewall portion and the tab portion is attachable to the seat back frame.

11. The assembly of claim 10 wherein the body portion is configured to maintain integrity of the sidewall portion during air bag module deployment.

12. The assembly of claim 7 wherein the panel comprises a fabric.

* * * * *